Nov. 20, 1956  G. L. OLSON  2,770,993
TOOL SUPPORTING STRUCTURE
Filed March 25, 1953  2 Sheets-Sheet 1
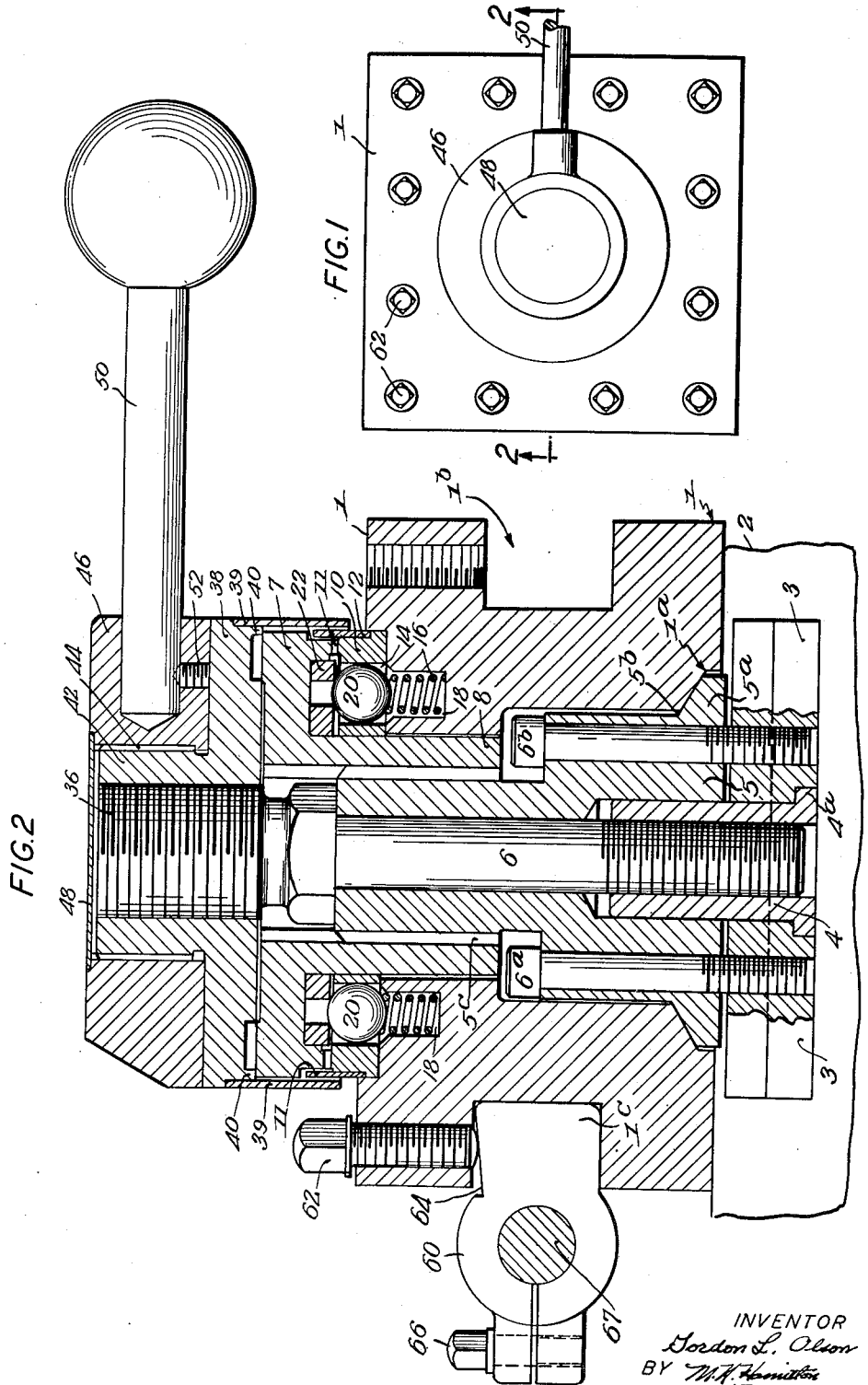
INVENTOR
Gordon L. Olson
BY M. K. Hamilton
ATTORNEY Nov. 20, 1956 G. L. OLSON 2,770,993
TOOL SUPPORTING STRUCTURE
Filed March 25, 1953 2 Sheets-Sheet 2
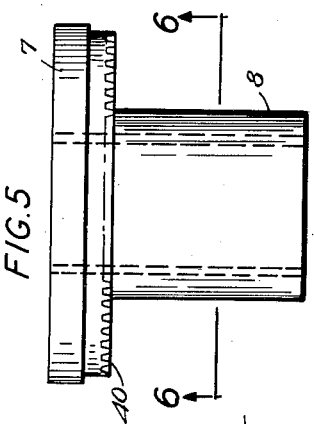
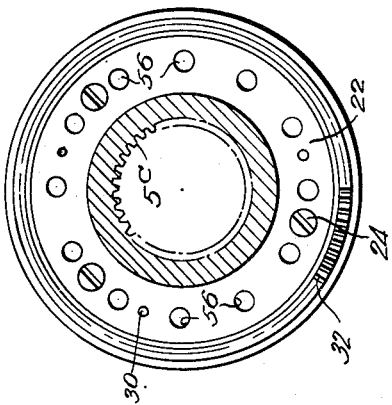
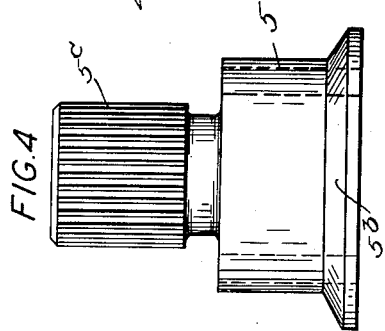
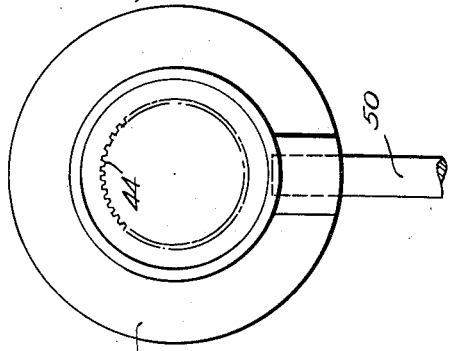
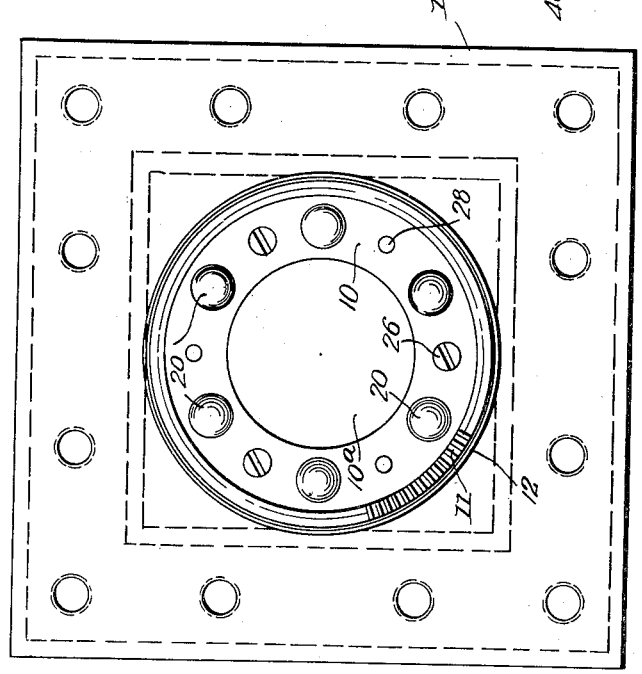
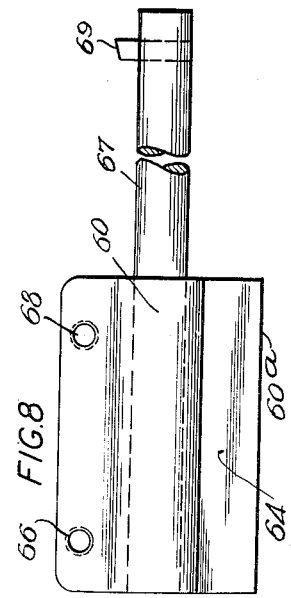
INVENTOR
Gordon L. Olson
BY M. N. Hamilton
ATTORNEY United States Patent Office 2,770,993
Patented Nov. 20, 1956

2,770,993

TOOL SUPPORTING STRUCTURE

Gordon L. Olson, Arlington, Mass.

Application March 25, 1953, Serial No. 344,568

2 Claims. (Cl. 82—36)

This invention relates to an improved tool supporting structure of the turret type, such as is employed in engine lathes, turret lathes, and other machine tools.

It is an object of the present invention to devise a tool supporting structure which is characterized by an unusually wide range of working positions, and which can be quickly and simply adjusted for operation in any one of these positions. Another object of the invention is to provide a tool supporting structure which can be manufactured with a minimum cost and readily assembled and taken apart to facilitate making repairs. Still another object is to devise a tool supporting structure which is of very rugged construction and which is, nevertheless, adapted for use in machines where a high degree of accuracy is required in connection with the machining operation. It is also an object to devise an association of parts in a member of the character referred to, whereby a desirable shielding action may be provided for in order to protect the indexing plate means from picking up dirt, chips, or other foreign materials.

These and other objects and novel features will be more fully understood and appreciated from the following description of a preferred embodiment of the invention selected for purposes of illustration and shown in the accompanying drawings, in which Fig. 1 is a plan view of a tool supporting structure constructed in accordance with the invention;

Fig. 2 is a cross-section taken on the line 2—2 of Fig. 1;

Fig. 3 is another plan view showing the turret body portion of the tool supporting structure with certain indexing and locking mechanism removed therefrom;

Fig. 4 is a detail elevational view of the cylindrical bearing member removed from the tool supporting structure shown in Figs. 1 and 2;

Fig. 5 is another elevational view showing one element of the indexing mechanism employed in the tool supporting structure of Fig. 2;

Fig. 6 is a cross-section taken on the line 6—6 of Fig. 5;

Fig. 7 is a bottom plan view of a locking cover plate and handle assembly; and

Fig. 8 is a detail plan view illustrating a detachable tool holder element removed from the turret body.

In the structure shown in the drawings, numeral 2 denotes a broken-away portion of a compound rest of the conventional form employed in some types of lathes. This member, as shown in Fig. 2, may be formed with a T-slot of the usual character, in which slot is slidably received an anchor plate 3.

It is customary to provide for use with the conventional T-slot and anchor plate arrangement described various forms of tool holder mechanisms, any one of which generally includes a turret body rotatable about a vertical axis and adapted to support a tool in varying desired positions with reference to a work piece. An important requirement in such mechanisms is that the turret body be supported in such a manner that it may be quickly and conveniently turned through a series of different positions.

Many proposals have been made for constructing a turret assembly which will provide the desired ease and simplicity of operation throughout a suitable working range. However, one common difficulty is experienced in solidly locking the tool in any one of the desired positions of adjustment so that there will be an absence of vibration or "chatter," on the one hand, and yet the operator can, on the other hand, quickly and conveniently release the turret and then move it from one position of adjustment to another without interfering with other parts of the machinery employed.

A particular problem develops from the fact that between the main turret body and the immediately adjacent parts on which it is rotatably supported there must be sufficient clearance in order to provide for ease of turning. This clearance, however, may tend to permit the turret body, when in operation, to move on its bearing components and, at machine speeds such as are customarily employed, to vibrate and produce objectionable chatter.

In accordance with the invention I have devised a novel and improved tool supporting structure wherein the turret body is supported in such a manner that it may be solidly locked against its bearing components so that there is no lost motion and no opportunity for vibration or chatter to develop. At the same time the assembly of the turret body and its bearing components is so designed and locked together that one simple release movement instantly unlocks the entire turret body assembly and permits easy turning of the turret body into any desired position with a minimum of effort and little loss of time. Furthermore, I have combined with this locking mechanism an operating handle arrangement which can be advantageously placed so as to avoid interference with other machine parts throughout an entire circle of working positions.

An important feature of my tool supporting structure is a conical bearing assembly for a turret body around which is constructed a special indexing and turret locking mechanism adapted to cooperate with the conical bearing assembly to provide for ease of turning with selectivity in locating the turret body in a desired position and in solidly locking the turret in any position in which it may be placed.

Considering the improved turret assembly of the invention in greater detail, attention is directed to Figs. 1 and 2 wherein it will be seen that I have provided a guide bushing member 4 which is received through the anchor plate 3 and which comprises a base about which the conical bearing assembly of the invention is mounted. The bushing 4 is preferably formed with an annular shouldered portion 4a which is adapted to bear against a similar shouldered portion in the anchor plate 3, as noted in Fig. 2.

Located about the guide bushing 4 is one element of the conical bearing assembly of the invention consisting of a turret bearing sleeve 5 which has an enlarged annular base 5a formed with a conical seating surface 5b, best shown in Fig. 4. The member 5 is preferably secured around the guide bushing 4 and in spaced relation to the anchor plate 3 by means of two cap screws 6a and 6b located through two opposite shouldered portions of the bearing member 5 and threaded into the anchor plate 3, as noted in Fig. 2. Also securing the bearing member 5 solidly to the guide bushing 4 is a large centrally located screw 6 which extends all the way through the turret body 1 and has its lower end threaded into an internally threaded portion of the bushing 4, as shown in Fig. 2.

The upper portion of the turret bearing sleeve 5 includes a tubular extension which extends well above the guide bushing 4 and is formed with outer splined portions 5c. Slidably secured about these splined portions 5c is an annular indexing head 7 which includes a lower cylindrical sleeve portion 8.

Freely supported around the cylindrical sleeve portion 3 and the lower section of the turret bearing sleeve 5 is a turret member 1. This member has, as an integral part of its inner peripheral portion, a second element of the conical bearing assembly of the invention consisting of a conical bearing surface 1a which coincides with, and is complemental to, the conical bearing surface 5a on the bearing sleeve 5 so that the turret body may be rotatably supported thereon. With this arrangement it is pointed out that the turret in a locked position is not subject to any lost motion as a result of the slight clearance between the inner periphery of the turret and adjacent surfaces of sleeve portions 5 and 8.

The turret member 1, also shown in Figs. 1 and 3, may, for example, comprise a four-sided body, each of which sides is recessed to form openings, as 1b and 1c, which constitute tool holding sockets. The turret body is, however, not limited to a four-sided structure but may also be consructed of various other shapes, such as polygonal, hexagonal, and the like, with any one or all of such sides being recessed in the manner shown in Fig. 2.

The upper side of the turret body 1 has been recessed to provide an annular opening in which is snugly fitted a circular index plate member 10, more clearly shown in Fig. 3 of the drawings. This indexing plate is formed with an inner bore 10a through which the cylindrical sleeve portion 8 is received. At the upper surface of the index plate 10 are provided a series of gear teeth 11 and extending around these teeth is a protective skirt member 12 which is recessed into the outer peripheral portion of the indexing plate 10, as illustrated in Fig. 2.

At spaced-apart intervals around the indexing plate have been formed circular openings 14 in which are resiliently supported on springs 16 in recessed slots 18 a plurality of ball elements 20. These ball elements are held in a position such that they may be compressed downwardly against the action of the spring into a position in which the uppermost surface of the balls occurs very slightly above the top surface of the indexing plate, as shown in Fig. 2. However, when allowed to move upwardly in response to the action of the springs 16 the balls are capable of exerting an appreciable lifting force against gear portions 32 of an insert ring 22 secured in recessed relation in the under side of the indexing member 7, as shown in Fig. 2.

The ring 22 is preferably secured by means of screws 24 and, similarly, the indexing member 10 may be secured by screws, such as 26, best shown in Figs. 3 and 6. I may also desire to provide in the indexing member 10 dowel members, as 28, and these dowels may be received in dowel openings 30 formed in the surface of the ring member 22 in one position of adjustment. The dowel openings 30 are best shown in Fig. 6.

The gear portions 32 extend around the outer periphery of the ring member 22 and are constructed and arranged to overlie and mesh with the gear portions 11 on the indexing plate 10 when the two indexing members are forced toward one another. Also located around these indexing members 10 and 7 is a skirt 39 which is recessed into a locking ring member 38 disposed immediately above the indexing member 7. The skirt 39 is constructed of a size and disposed so that the inner periphery of the skirt extends downwardly in spaced-apart overlapping relation with respect to the skirt 12 which is supported on the member 10. As a result of this overlapping arrangement it will be seen that there is provided a pair of baffle elements for preventing passage of chips and other foreign bodies from points outside the machine into the space between the indexing members at any time and, moreover, such chips and dirt are excluded from passing downwardly between the conical bearing surfaces 1a and 5b.

The locking ring 38 is adapted to be threaded over threads 36 formed at the upper end of the large screw 6. This locking ring has portions of its bottom surface recessed to lie in slightly spaced-apart relation from the indexing head throughout most of its area, but the extreme outer circumferential portions of the locking ring present a bearing edge 40 adapted to extend downwardly into a position to engage against the index head 7 and to force this head downwardly against the action of the ball members 20 when the locking ring is tightened about the threads 36.

It will be seen that the locking ring 38 is further formed at its upper end with a cylindrical portion 42, the outer surface of which portion is provided with splines 44 and axially supported about this splined cylindrical portion is a correspondingly splined cap 46 having a closure plate 48 at the top thereof. A handle 50 is detachably secured through one side of the cap member 46 by means of a screw 52.

It is pointed out that this splined arrangement of the cap member on the cylindrical top 42 permits the handle and cap 46 to be conveniently placed on and removed from the locking ring 38 at any desired point so that the handle member 50 may be caused to extend at any desired angle and thus provides a considerable degree of flexibility in avoiding possible interference of this member with other machine parts in the course of a turning operation and, at the same time, the operator can, by proper use of the cap member and handle, avoid reaching across the moving parts of the machine and becoming entangled therewith.

In any position in which the cap and handle may be desired to be replaced it will be seen that it can be rotated in a manner to tighten the locking ring 38 about the threads 36 and this will compress the index head 7 downwardly against the ball members 20, and the gears 32 will then come into mesh with the gears 12 and lock the whole bearing assembly tightly together with the conical seating surface 1a of the turret member being tightly clamped against the conical bearing surface 5b of the member 5. The compressive forces thus exerted will positively prevent any working of the turret member on the bearing sleeve 5 and a solidly locked relationship of the parts can be obtained to the end that no looseness or chatter will develop in the course of a turning operation in which the turret head is employed to hold a tool.

When it is desired to change the position of the turret body, it is merely necessary to make a single adjustment, namely, an unloosening of the locking ring 38 by unscrewing the cap 46 and handle 50. A small rotative movement of these members permits the index head 7 to be forced upwardly in response to the action of the ball members 20 and springs 16, and thereupon the turret body 1 can be freely turned on its conical seat, since there are no frictional holding forces at any other point in the entire assembly. In setting the turret head into any one of a series of desired positions I may provide circular openings, as 56, in the ring member 22 into which openings the ball members 20 may move in going from one position to another, and thus facilitate quick setting of the turret in a particular desired position.

The indexing mechanism and conical bearing assembly described constitutes one important part of the invention. Another part of the invention which is of importance, and which has been devised especially for use with this turret indexing mechanism, comprises a special tool holding apparatus.

The recessed portions of the turret body which define tool holding slots and which have been indicated in the drawings by numerals 1b and 1c, are intended to comprise a means for supporting some form of tool holding element, such as a boring bar, for example, in which can be secured one or more cutting tools. It is further intended that in utilizing a tool holding element of this nature there may be supported in it one or more cutting tools, and if a plurality of cutting tools are employed they may be supported in parallel relation, and the whole assembly can be moved about in various ways to greatly extend the range of positions available.

Thus, in supporting a tool in the tool sockets 1b and 1c of the turret body I may employ a holder block, such as the holder member 60 in the manner suggested in Fig. 2. The holder block is further illustrated in Fig. 8 removed from the turret and further illustrating a boring bar 67 adjustably supported in the holder block 60 and having mounted therein a cutting tool 69. As noted in Fig. 8 the holder member 60 may comprise a flat bar section 60a which is adapted to fit into the sockets 1b and 1c and to be securely held by adjustment screws, as 62. To facilitate locking the bar sections 60a I may also form the upper surfaces of these members with a bevelled side 64 which cooperates with the screws 62 to produce a wedging action which solidly locks the bar sections in their respective sockets.

As will be observed from an inspection of Fig. 8, the holder portions may comprise two semi-annular parts split along one side and adapted to be adjustably tightened against one another by means of fastenings 66 and 68. In the cylindrical bore thus provided the boring rod 67, or other type of tool holder, may be solidly secured in any desired position and may, of course, be adjusted by moving it axially of itself through the cylindrical bore or by rotating about its longitudinal axis.

From the foregoing description it will be seen that I have provided a turret construction of unique indexing plate characteristics combined with a special self-locking conical bearing assembly. I have also combined with this turret construction special tool receptacle means, through the aid of which one or more cutting tools may be held in any desired position and may be moved through a greatly increased number of operating positions. In thus devising a structure of the class described the assembly of the constituent parts has been greatly simplified and the operation of installing cutting tools is facilitated. At the same time the turret construction is relatively simple and cheap to build and assemble.

This application is a continuation-in-part of my application Ser. No. 271,751, filed Feb. 15, 1952, for Improvements in Tool Supporting Structure, now abandoned.

While I have shown preferred embodiments of the invention, it should be understood that various changes and modifications may be resorted to in keeping with the scope of the invention as defined by the appended claims.

Having thus described my invention, what I desire to claim as new is:

1. An improved tool support comprising a base presenting a center support extending upwardly therefrom and an intermediate portion of the center support provided with a cylindrical elongated splined surface, said base further having a turret seating surface constructed at the lower portion thereof, an indexing sleeve formed with a cylindrical splined internal surface which is secured in sliding relationship with the splined surface of the center support, said indexing sleeve having an upper annular gear portion forming a part thereof, a turret body rotatably mounted on the said seating surface and around the said indexing sleeve, a second annular indexing gear fixed to the turret body in a position to mesh with the said upper annular gear portion, spring means for moving said indexing sleeve and upper indexing plate out of engagement with the said lower indexing plate to provide for rotative indexing movement of the turret body while the latter member is retained in seated relationship upon the said seating surface, a cap member including an operating handle operatively connected with the upper end of the center support and adapted to move the upper and lower annular gear portions into engagement with one another.

2. A structure as defined in claim 1, in which the depth of the teeth in the respective annular gear portions are chosen so that they constitute only a small fraction of the total length of the splined portion of the center support, whereby substantially zero back-lash is provided for between the splined portion of the center support and the indexing sleeve when the indexing sleeve has travelled through a distance necessary to disengage the respective annular gear portions.

References Cited in the file of this patent

UNITED STATES PATENTS

| Number | Name | Date |
|---|---|---|
| 409,484 | Myers | Aug. 20, 1889 |
| 462,160 | Pihl | Oct. 27, 1891 |
| 535,440 | Armstrong | Mar. 12, 1895 |
| 567,080 | Chard | Sept. 1, 1896 |
| 576,717 | Bogert | Feb. 9, 1897 |
| 1,152,055 | Schellenbach | Aug. 31, 1915 |
| 1,232,999 | Tolles | July 10, 1917 |
| 2,202,117 | Muller | May 28, 1940 |
| 2,366,079 | Wilson | Dec. 26, 1944 |
| 2,433,026 | Casella | Dec. 23, 1947 |
| 2,527,871 | Bakewell | Oct. 31, 1950 |
| 2,531,198 | Bruet | Nov. 21, 1950 |
| 2,547,616 | Beekman | Apr. 3, 1951 |